United States Patent
Ichikawa et al.

(10) Patent No.: US 6,491,333 B2
(45) Date of Patent: Dec. 10, 2002

(54) SUN VISOR HOLDER

(75) Inventors: Kouji Ichikawa, Nishikamo-gun (JP); Yoshinori Noritake, Toyota (JP); Eiji Hibi, Toyota (JP)

(73) Assignees: NIFKO Inc., Yokohama (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/904,845

(22) Filed: Jul. 16, 2001

(65) Prior Publication Data

US 2002/0017800 A1 Feb. 14, 2002

(30) Foreign Application Priority Data

Jul. 21, 2000 (JP) .................................... 2000-220303

(51) Int. Cl.$^7$ ................................................. B60J 3/00
(52) U.S. Cl. .................................. 296/97.9; 296/97.13
(58) Field of Search ........................... 296/97.9, 97.8, 296/97.1; 224/312; 248/902, 309.1

(56) References Cited

U.S. PATENT DOCUMENTS

| | | | | | |
|---|---|---|---|---|---|
| 4,989,911 A | * | 2/1991 | Van Order | ................. | 296/97.9 |
| 5,056,853 A | * | 10/1991 | Van Order | ................. | 296/97.9 |
| 5,061,005 A | * | 10/1991 | Van Order et al. | ........ | 296/97.9 |
| 5,082,322 A | * | 1/1992 | Cekander et al. | .......... | 296/97.9 |
| 5,201,564 A | * | 4/1993 | Price | ........................... | 296/97.9 |
| 5,242,204 A | * | 9/1993 | Kitterman et al. | ......... | 296/97.9 |
| 5,314,227 A | * | 5/1994 | Weiland et al. | ............ | 296/97.9 |
| 5,358,299 A | * | 10/1994 | Seto | ........................... | 296/97.9 |
| 5,411,310 A | * | 5/1995 | Viertel et al. | .............. | 296/97.9 |
| 5,507,545 A | * | 4/1996 | Krysiak | ...................... | 296/97.9 |
| 5,560,669 A | | 10/1996 | Gute | | |
| 5,967,589 A | * | 10/1999 | Spadafora | ................. | 296/97.9 |
| 5,975,617 A | * | 11/1999 | Jacquemin et al. | ........ | 296/97.9 |
| 6,021,986 A | * | 2/2000 | Murdock | .................... | 296/97.9 |
| 6,068,323 A | * | 5/2000 | Brown et al. | .............. | 296/97.9 |
| 6,098,940 A | * | 8/2000 | Jacquemin | ............. | 248/220.21 |
| 6,113,253 A | * | 9/2000 | Yoshii et al. | ............ | 296/97.13 |
| 6,196,756 B1 | * | 3/2001 | Leverger | .................... | 403/326 |
| 6,250,708 B1 | * | 6/2001 | Kurachi | ...................... | 296/97.9 |
| 6,324,732 B1 | * | 12/2001 | Arisaka et al. | ............ | 296/97.9 |
| 6,336,672 B2 | * | 1/2002 | Beaver | ....................... | 296/97.9 |
| 2001/0025909 A1 | * | 10/2001 | Sawayanagi | ............... | 296/97.9 |
| 2001/0042999 A1 | * | 11/2001 | Asai | .......................... | 296/214 |

FOREIGN PATENT DOCUMENTS

| | | | |
|---|---|---|---|
| DE | 43 33 494 | * | 4/1994 |
| EP | 1 081 395 A1 | | 3/2001 |
| GB | 2 333 800 | * | 12/1998 |
| JP | 4-110224 | * | 4/1992 |
| JP | 5-96953 | * | 4/1993 |
| JP | Y2 2525910 | | 11/1996 |
| JP | P2000-85353 A | * | 3/2000 |

OTHER PUBLICATIONS

JII Journal of Technical Disclosure, No. 99–3710, Jun. 1, 1999, Kenji Chiba.

* cited by examiner

*Primary Examiner*—Kiran Patel
(74) *Attorney, Agent, or Firm*—Oliff & Berridge, PLC

(57) ABSTRACT

There is provided a sun visor holder wherein efficiency with which the sun visor holder is mounted on a body panel is greatly improved. A sun visor holder includes holding pieces engaging with an interior material, and also includes engaging claws engaging with and nipping a body panel, and a flange portion. The sun visor holder can be mounted at the body panel in a state of being temporarily fastened to the interior material, and can also be mounted by simply being inserted in mounting holes. Therefore, the efficiency with which the sun visor holder is mounted on the body panel is greatly improved.

23 Claims, 8 Drawing Sheets

SUN VISOR HOLDER

BACKGROUND OF THE INVENTION

1. Field of the Invention

The present invention relates to a sun visor holder mounted in an interior of an automobile and holding a shaft of a sun visor.

2. Description of the Related Art

FIG. 8 shows an example of a conventional sun visor holder (see Japanese Utility Model Registration No. 2525910).

In a sun visor holder 310 shown therein, a shaft of a sun visor (not illustrated) is elastically engaged with an engaging portion 314 formed integrally with a main body 312, and the sun visor is held by the sun visor holder 310.

A cylinder portion 316, through which a screw is inserted and passed, and a projection 318 are formed in the main body 312. When the sun visor holder 310 is mounted, the projection 318 is used as a positioning member and a screw is inserted in and passed through the cylinder portion 316 and screwed in respective mounting holes of an interior material and a body panel. As a result, the sun visor holder 310 is mounted via the interior material at the body panel.

However, the sun visor holder 310 is, as described above, mounted via the interior material at the body panel by screwing the screw. Therefore, it is necessary to fasten the screw in a state in which the mounting hole of the interior material and the mounting hole of the body panel are made to coincide with each other at the time of mounting. As a result, operating efficiency is poor.

SUMMARY OF THE INVENTION

In view of the above-described circumstances, an object of the present invention is to provide a sun visor holder wherein the efficiency with which the sun visor holder is mounted on a body panel is greatly improved.

A first aspect of the present invention is a sun visor holder comprising: a holding portion which can hold a shaft of a sun visor; an interior material engaging portion which engages with an interior material of a vehicle; and a body panel engaging portion which engages with a body panel of the vehicle in a state in which the interior material engaging portion engages with the interior material.

When the sun visor holder is mounted in a vehicle, first, the interior material engaging portion is engaged with (temporarily fastened to) the interior material. Next, in the state in which the interior material engaging portion is engaged with the interior material, the body panel engaging portion is engaged with the body panel. As a result, the sun visor holder is mounted in the vehicle. Thus, the sun visor holder can be mounted in the vehicle by engaging the same sequentially with the interior material and the body panel. Therefore, it is not necessary to pre-align the interior material and the body panel with each other (that is, to coincide respective mounting holes with each other) as in a conventional sun visor holder. Further, operating efficiency in mounting the same on a vehicle body is excellent.

In accordance with a second aspect of the present invention, in the first aspect, the sun visor holder further comprises: an insertion portion inserted both in a mounting hole formed in the interior material and in a mounting hole formed in the body panel, wherein the interior material engaging portion can be engaged with the interior material by an operation of inserting the insertion portion in the mounting hole of the interior material, and the body panel engaging portion can be engaged with the body panel by an operation of inserting the insertion portion in the mounting hole of the body panel.

In the sun visor holder of the second aspect, first, when the insertion portion is inserted in the mounting hole of the interior material, the interior material engaging portion is engaged with the interior material due to the inserting operation. Next, when the insertion portion is further inserted in the mounting hole of the body panel from the above-described state, the body panel engaging portion is engaged with the body panel due to the inserting operation.

As described above, the sun visor holder can be mounted on the vehicle body in a state of being engaged with the interior material and also with the body panel by simply inserting the insertion portion in the mounting hole of the interior material and in the mounting hole of the body panel. It is not necessary to fasten the screw as in a conventional sun visor holder. Therefore, the efficiency with which the sun visor holder is mounted on the vehicle body is further improved.

In accordance with a third aspect of the present invention, in the second aspect, the insertion portion includes a fitting portion which is fit into the mounting hole of the interior material in a state in which the interior material engaging portion is engaged with the interior material; and the interior material engaging portion is formed so as to contact the interior material from a side of an end of the insertion portion, with the fitting portion being fit into the mounting hole of the interior material.

In the state in which the insertion portion is inserted in the mounting hole of the interior material and the interior material engaging portion is engaged with the interior material (a temporarily fastened state), the engaging portion is engaged with the mounting hole of the interior material. Therefore, unstable mounting of the sun visor holder in the temporarily fastened state is prevented to facilitate mounting.

Further, the interior material engaging portion contacts the interior material from the side of the end of the insertion portion in the state in which the engaging portion is engaged with the mounting hole of the interior material. As a result, movement of the insertion portion is prevented by the interior material engaging portion. Therefore, the state in which the engaging portion is engaged with the mounting hole of the interior material is maintained.

In accordance with a fourth aspect of the present invention, in any one of the first to third aspects, the sun visor holder further comprises: a grommet member including the interior material engaging portion and a nipping portion for nipping the body panel together with the body panel engaging portion; and a holder member including the holding portion and the body panel engaging portion and engaged with the grommet member by being rotated, the holder member including a rotation stopping portion for stopping rotation of the holder member in a state of being engaged with the grommet member.

Since the sun visor holder is formed by two members, that is, the grommet member and the holder member, the freedom, with which the shape of the sun visor holder may be optionally formed, increases and manufacturing costs can be reduced. Moreover, in the state in which the holder member is rotated to and engaged with the grommet member, rotation of the holder member is stopped by the rotation stopping portion. Accordingly, the holder member and the grommet member can be maintained in the engaged state.

Further, the grommet member includes a nipping portion which nips the body panel together with the body panel engaging portion, and the sun visor holder can be mounted at the body panel in a stable manner by nipping the body panel.

In accordance with a fifth aspect of the present invention, in the fourth aspect, the holder member includes a fragile portion which is broken when a load of a predetermined value or more acts on the holding portion.

When a load of a predetermined value or more acts on the holding portion due to an impact or the like, the fragile portion is broken. At this time, a part of the holder member and the grommet member remain on the vehicle body. Therefore, no pieces of a broken component of the sun visor holder fly apart in the interior of a vehicle.

In accordance with a sixth aspect of the present invention, in the fourth aspect, the rotation stopping portion is a protruding member, and the rotation stopping portion is engaged with a groove portion formed in the grommet member to prevent relative rotation of the holder member with respect to the grommet member in a state in which the holder member is engaged with the grommet member.

In accordance with a seventh aspect of the present invention, in the second aspect, one end of the interior material engaging portion is provided at the insertion portion and another end of the interior material engaging portion extends in a direction opposite to an insertion direction of the insertion portion so as to be apart from the insertion portion, and the interior material engaging portion can deform elastically to be close to the insertion portion.

In accordance with an eighth aspect of the present invention, in the second aspect, the body panel engaging portion protrudes outside of the insertion portion, and can deform elastically inside of the insertion portion.

In accordance with a ninth aspect of the present invention, in the second aspect, a first guide surface is formed in the body panel engaging portion, the first guide surface guiding the body panel engaging portion so as to elastically deform inside of the insertion portion when the insertion portion is inserted into the mounting hole of the body panel.

In accordance with a tenth aspect of the present invention, in the fourth aspect, a second guide surface is formed in the body panel engaging portion, the second guide surface guiding the body panel engaging portion so as to elastically deform inside of the grommet member when the holder member is relatively rotated with respect to the grommet member in a state in which the holder member is engaged with the grommet member.

In accordance with an eleventh aspect of the present invention, in the second aspect, an end portion of the insertion portion has a tapered shape.

In accordance with a twelfth aspect of the present invention, there is provided a sun visor holder comprising: a holding portion which can hold a shaft of a sun visor; an interior material engaging portion which engages with an interior material of a vehicle; a body panel engaging portion which engages with a body panel of the vehicle in a state in which the interior material engaging portion engages with the interior material; and an insertion portion inserted both in a mounting hole formed in the interior material and in a mounting hole formed in the body panel; wherein the interior material engaging portion can be engaged with the interior material such that when the insertion portion is inserted into the mounting hole of the interior material, the interior material engaging portion deforms according to an insertion of the insertion portion to the mounting hole of the interior material, and after the insertion of the insertion portion into the mounting hole of the interior material, the interior material engaging portion returns to a substantially original shape thereof, and the body panel engaging portion can be engaged with the body panel such that when the body panel engaging portion is inserted into the mounting hole of the body panel, the body panel engaging portion deforms according to an insertion of the insertion portion into the mounting hole of the body panel, and after the insertion of the insertion portion into the mounting hole of the body panel, the body panel engaging portion returns to a substantially original shape thereof.

DESCRIPTION OF THE PREFERRED EMBODIMENTS

Figure 5:
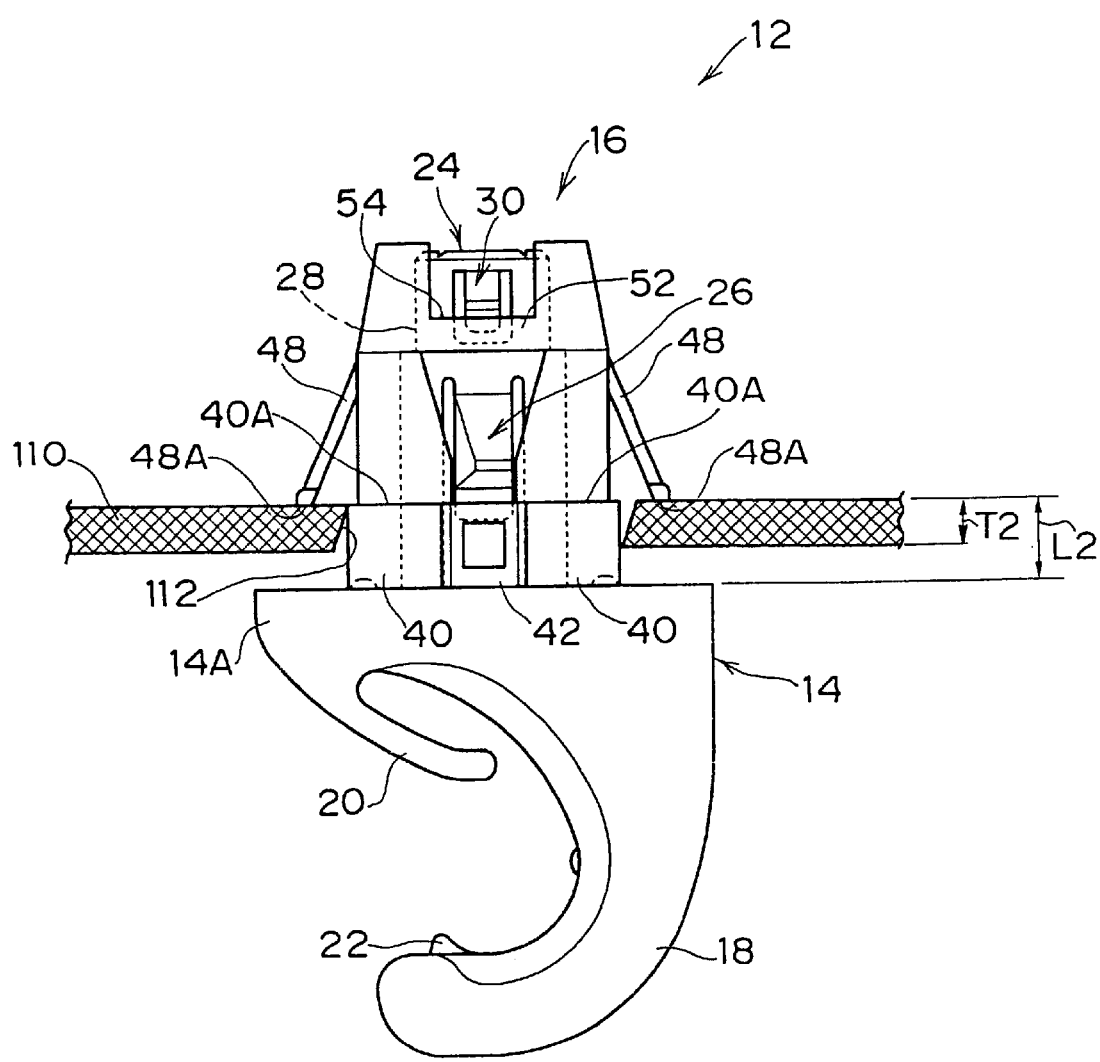
FIG. 5 is a diagram showing a state in which the sun visor holder according to the embodiment of the present invention is temporarily fastened to an interior material.
Figure 6:
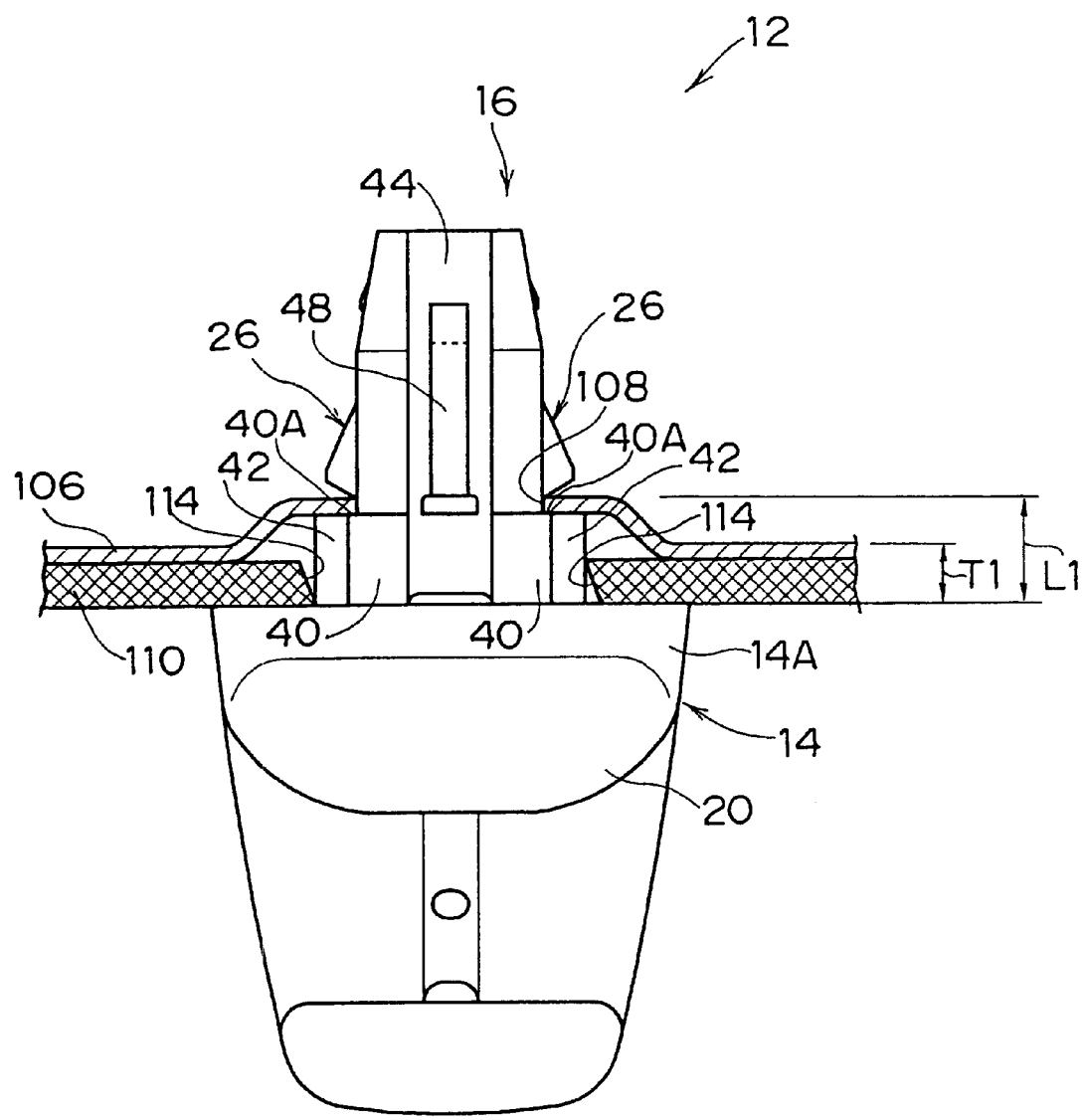
FIG. 6 is a diagram showing a state in which the sun visor holder according to the embodiment of the present invention is mounted on a body panel.
Figure 7:
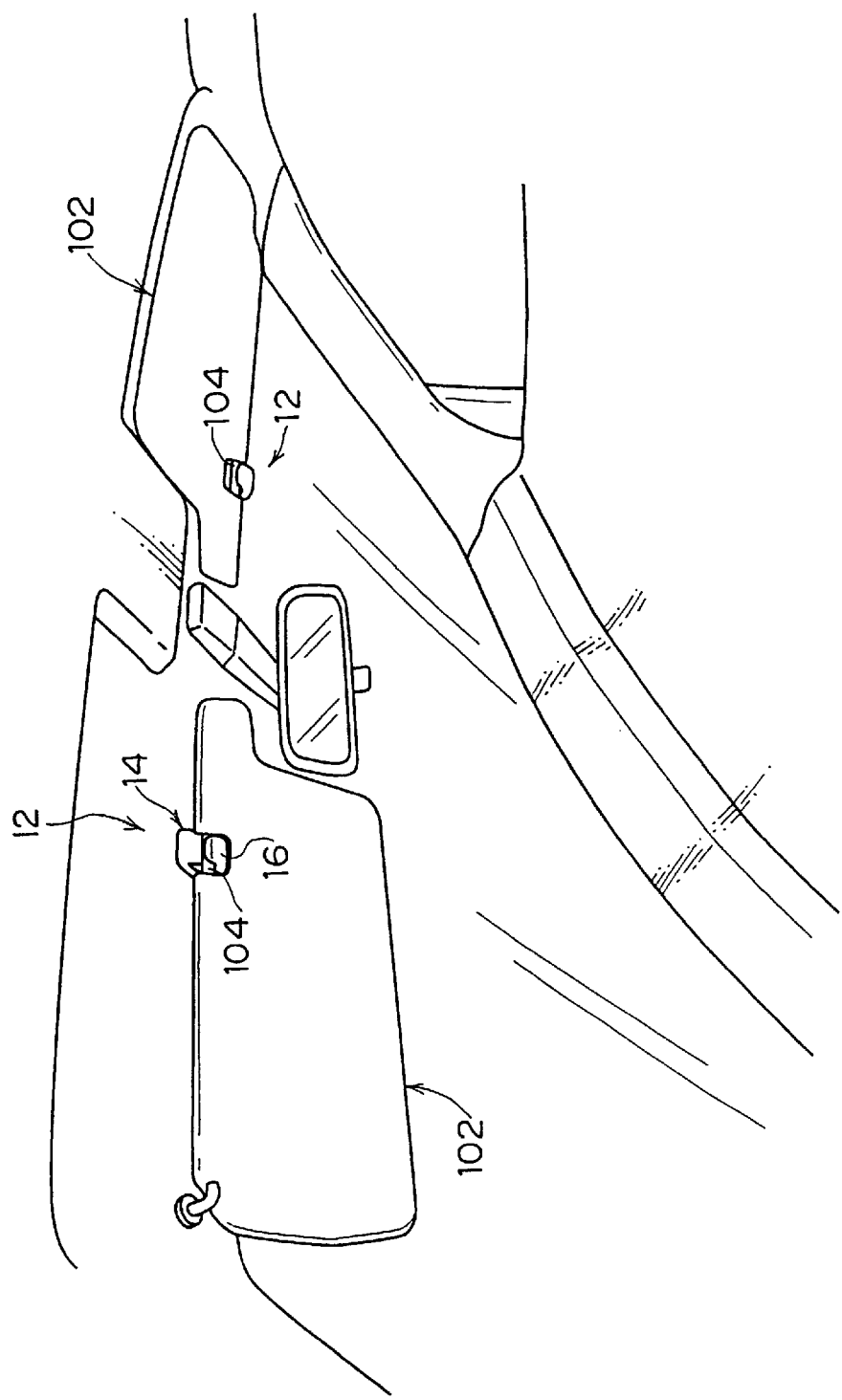
FIG. 7 is a perspective view which partially shows an interior of a vehicle in which the sun visor holder according to the embodiment of the present invention is mounted.
Figure 8:
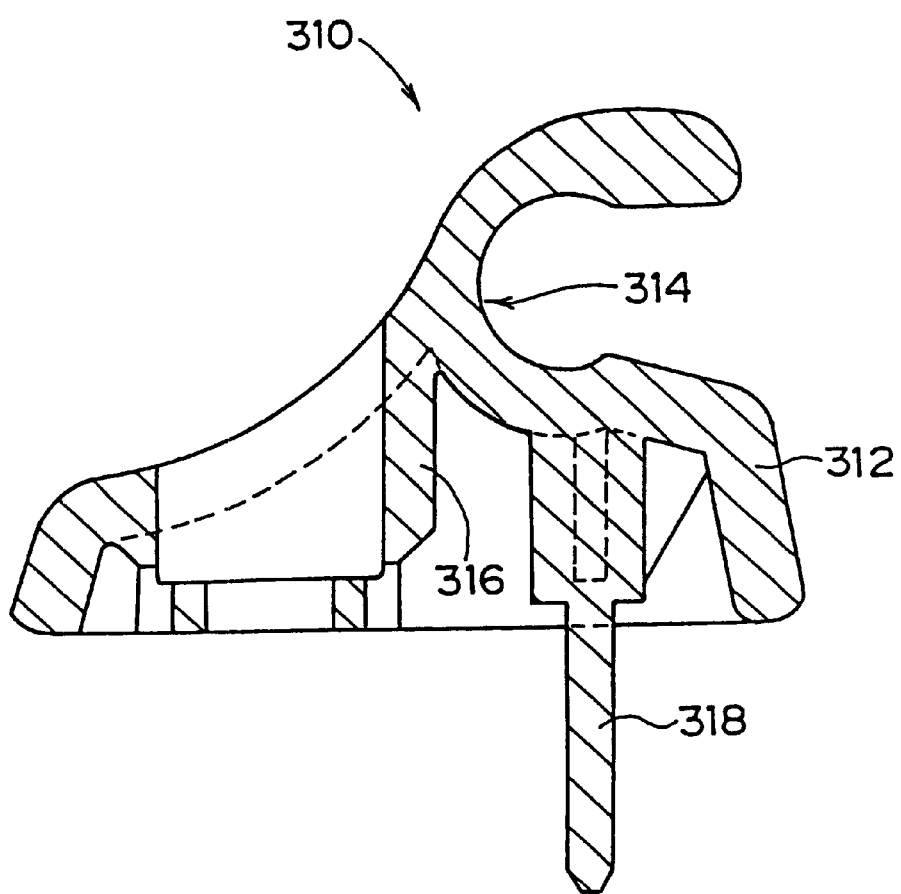
FIG. 8 is a cross sectional view showing a conventional sun visor holder.

FIGS. 1 to 6 show a sun visor holder 12 according to an embodiment of the present invention. FIG. 7 shows a portion of an interior of an automobile in which the sun visor holder 12 is mounted. The sun visor holder 12 is used to hold a shaft 104 of a sun visor 102 in the interior of a vehicle.

Figure 1:
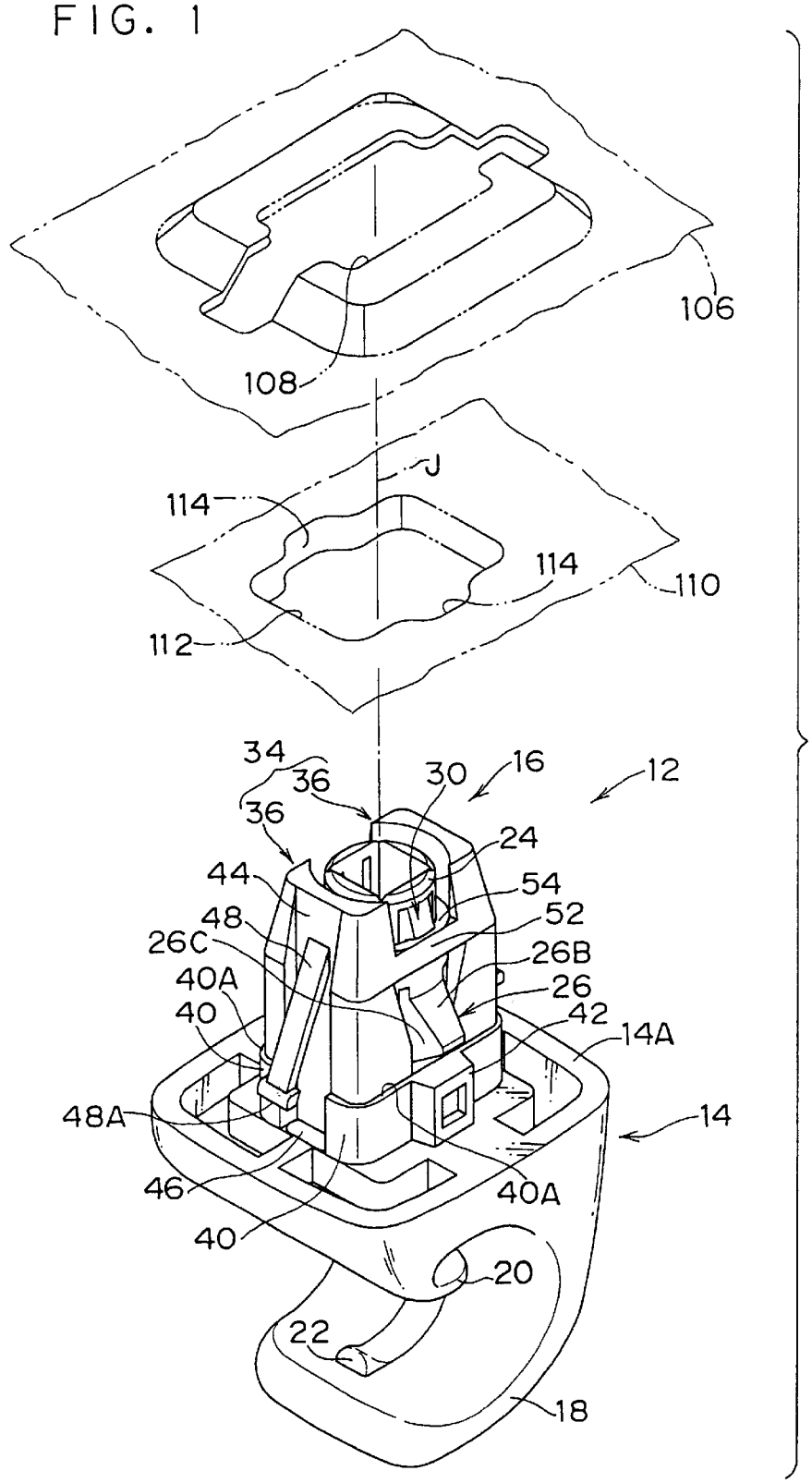
FIG. 1 is an exploded perspective view showing a sun visor holder according to an embodiment of the present invention.
Figure 2:
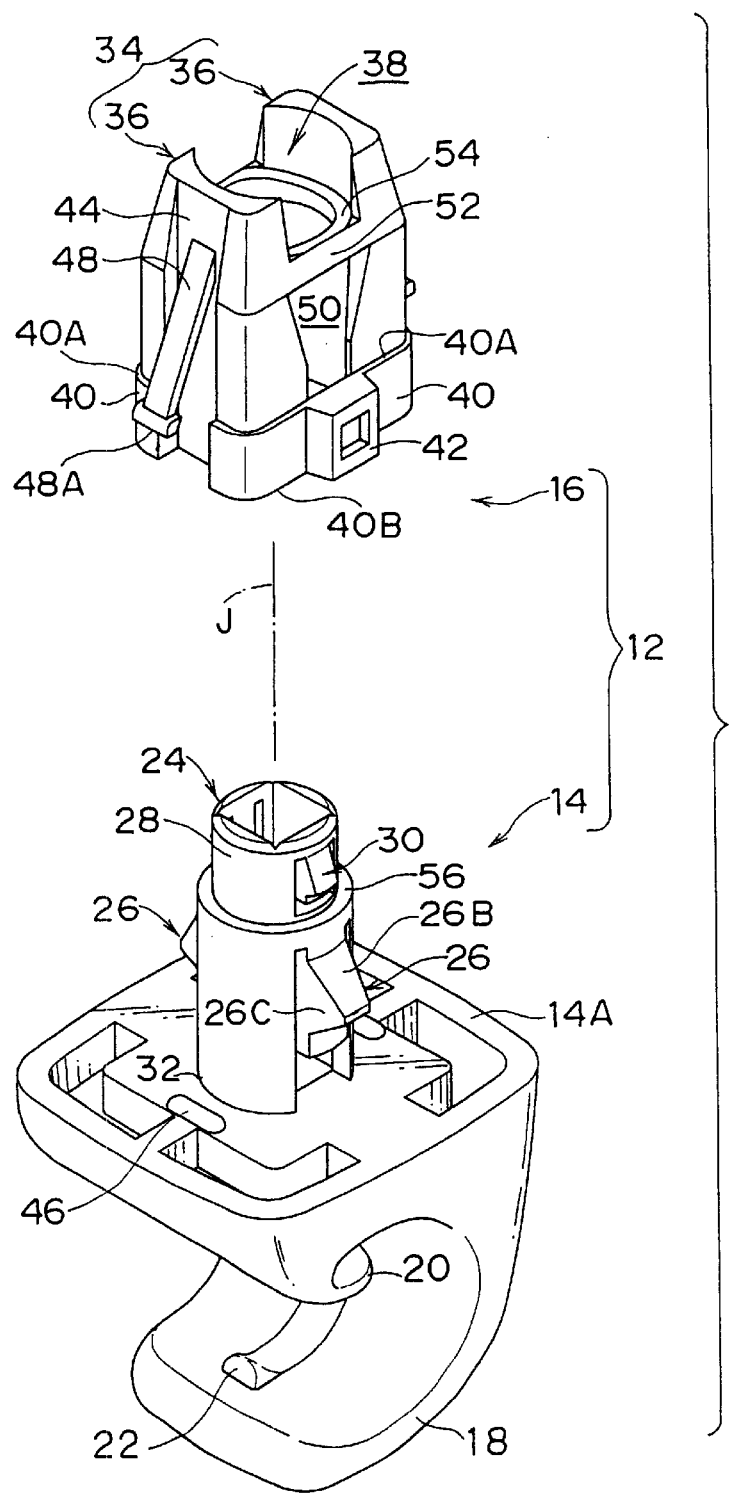
FIG. 2 is a perspective view showing the sun visor holder according to the embodiment of the present invention.
Figure 3:
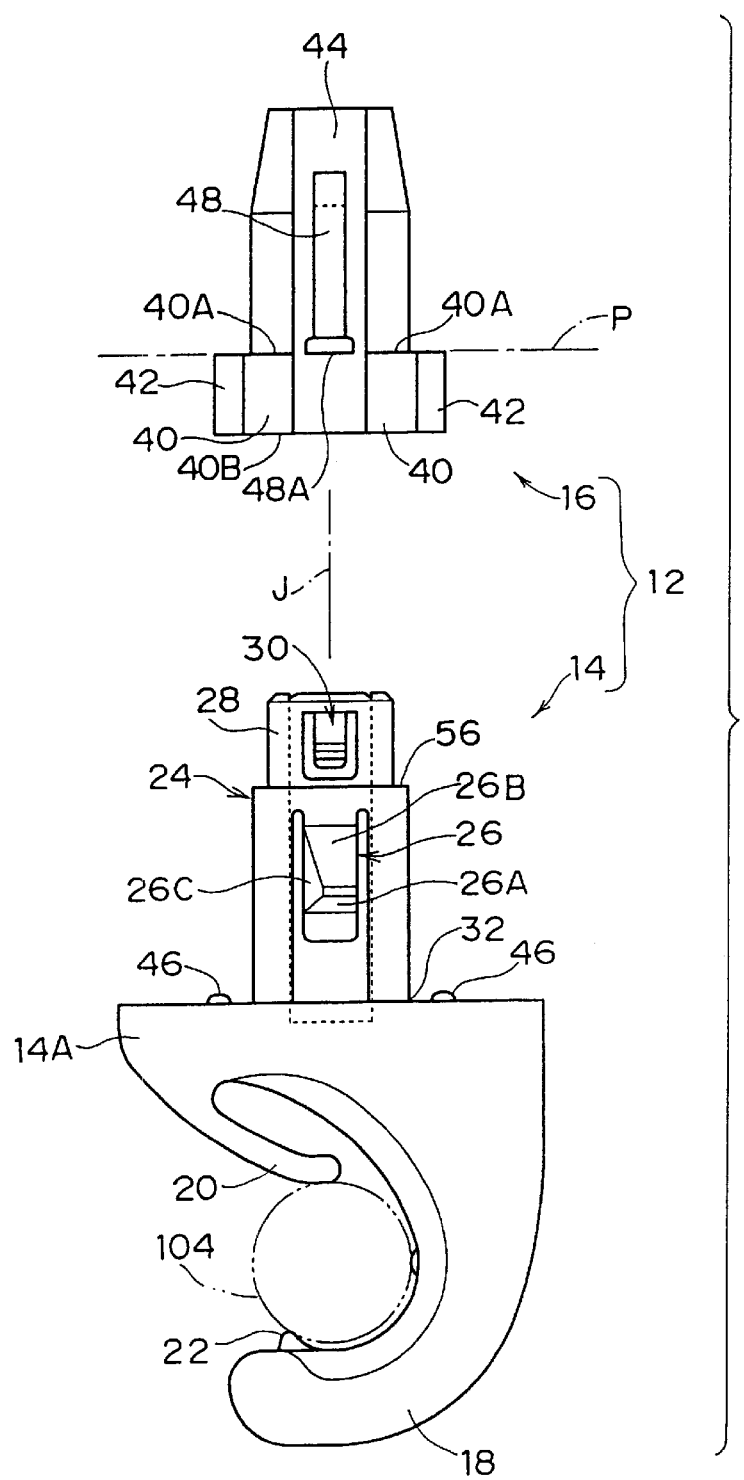
FIG. 3 is a front view of a grommet member and a side view of a holder member, in the sun visor holder according to the embodiment of the present invention.
Figure 4:
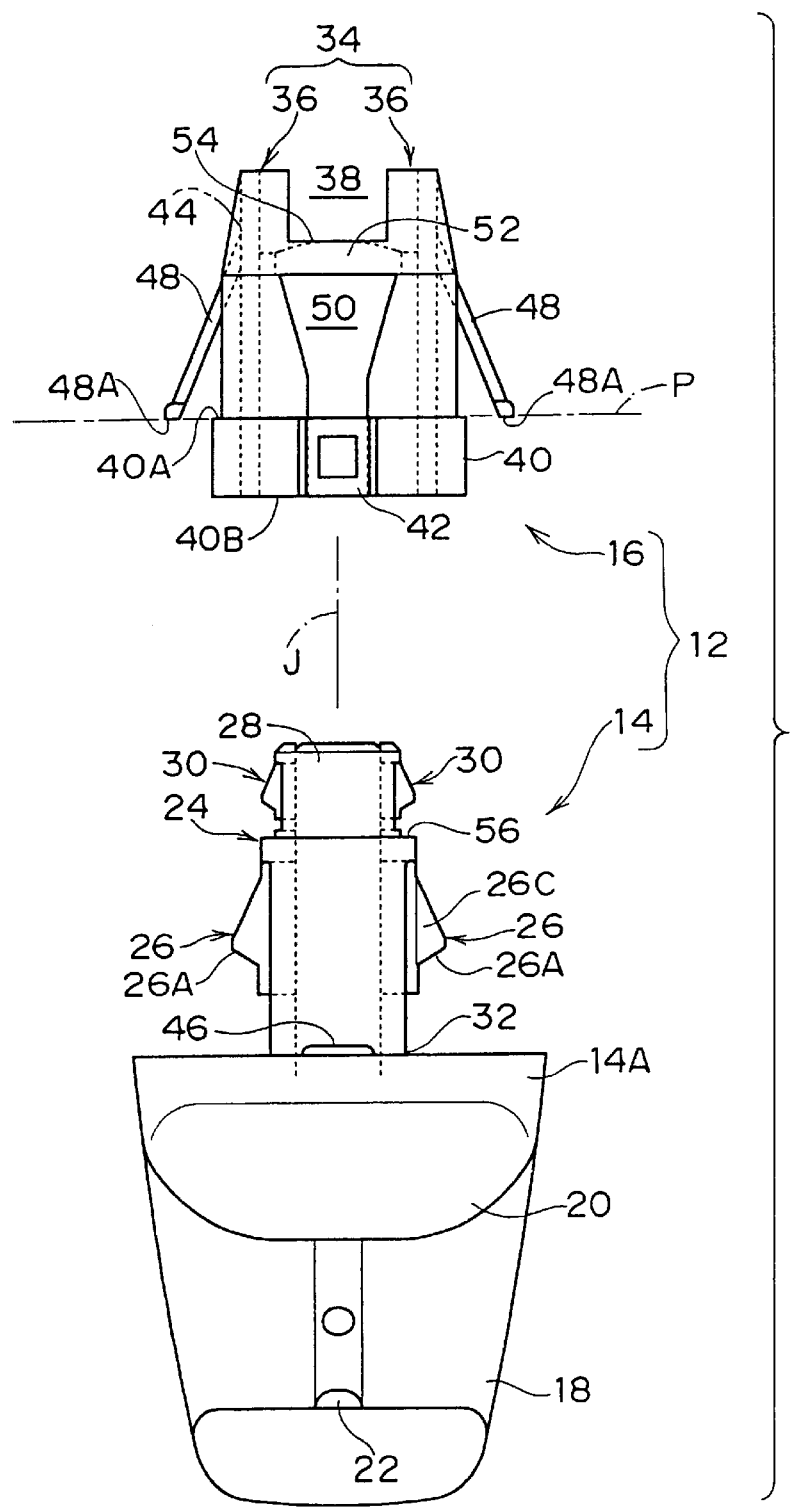
FIG. 4 is a side view of the grommet member and a front view of the holder member, in the sun visor holder according to the embodiment of the present invention.

The sun visor holder 12 includes a holder member 14 and a grommet member 16 as is also seen in FIGS. 2 to 4, and is structured such that these members are integrally assembled with respective center lines (indicated by an axial line J) thereof being made to coincide with each other. In the description given below, the "sun visor holder 12" with no proviso means a sun visor holder in which the holder member 14 and the grommet member 16 are integrally assembled.

The holder member 14 includes a holder portion 18 which is bent to allow holding of the shaft 104 of the sun visor 102. A plate spring piece 20 is formed so as to extend from a main body 14A of the holder member 14. When the shaft 104 is pushed into the holder portion 18, it is pressed against an inner surface of the holder portion 18 due to elastic force of the plate spring piece 20. Further, a projection 22 is formed on the inner surface of the holder portion 18 to engage with the shaft 104 within the holder portion 18. As a result, as shown in FIG. 3, the shaft 104 is reliably held within the holder portion 18 and is prevented from inadvertently coming out from the holder portion 18. When the shaft 104 is pulled out from the holder portion 18, it suffices that the shaft 104 be pulled out against urging force of the plate spring piece 20 (or may be pulled out by slightly deforming the holder portion 18).

A leg portion 24 extends from the center of the main body 14A of the holder member 14 toward the side opposite to the side at which the holder portion 18 is provided. The leg portion 24 has a substantially cylindrical configuration, and a pair of cantilever type engaging claws 26 are formed substantially at the middle of an axial direction (longitudinal direction) of the leg portion 24.

As shown in FIGS. 3 and 4, a surface of each engaging claw 26 facing the main body 14A is formed as an engaging surface 26A which engages with an edge of a mounting hole 108 of a body panel 106 (see FIG. 6), as described later. Further, a surface of each engaging claw 26 opposite to the engaging surface 26A is formed as a guiding surface (an incline surface) 26B. When the grommet member 16 is mounted at the leg portion 24, the guiding surface 26B is pushed by the grommet member 16 such that the engaging claw 26 is deformed inwardly.

As shown in FIG. 3, each of the engaging claws 26 is provided with a release inclined surface 26C on one of side surfaces of the engaging claw 26 when the engaging claw 26 is seen from the front (that is, the side surface of the engaging claw 26 at the left side in FIG. 3 in the present embodiment). When the grommet member 16 is rotated around the axial line J in a state of being mounted at the leg portion 24, the release inclined surface 26C is pushed by the grommet member 16 and the engaging claw 26 deflects inwardly. As a result, the grommet member 16 can be removed from the holder member 14.

The leg portion 24 includes a small diameter portion 28 which is formed via a stepped portion 56 further at an end thereof than the engaging claws 26. Namely, a portion of the leg portion 24 at which the engaging claws 26 are formed may be called a large diameter portion, and the stepped portion 56 is formed between the small diameter portion 28 and the large diameter portion. The small diameter portion 28 includes engaging projections 30. The engaging projections 30 are engaged with an engaging end surface 54 of the grommet member 16 when the grommet member 16 is mounted at the leg portion 24, thereby preventing the grommet member 16 from inadvertently coming out from the leg portion 24.

A base of the leg portion 24 is formed as a fragile portion 32 which is broken due to force of a predetermined value or more when a relative torsional force acts on the leg portion 24 and the main body 14A.

A main body 34 of the grommet member 16 is entirely formed substantially into a rectangular parallelopiped in which two block portions 36 face each other at a fixed interval. An insertion portion 38 is formed at the center of the grommet member 16 (between the two block portions 36), and the leg portion 24 is inserted in the insertion portion 38. Further, flange portions 40 are formed, at the side of the main body 34 facing the holder member 14, by expanding the main body 34 outward substantially along the entire periphery of the main body 34. In the state in which the grommet member 16 is mounted at the leg portion 24, a lower end surface 40B of the flange portion 40 surface-contacts the main body 14A of the holder member 14. The body panel 106 is held by engaging end surfaces 40A of the flange portions 40 and the engaging surface 26A of the engaging claw 26. As shown in FIG. 6, an axial-direction length L1 between a position at which the body panel 106 is held, and the end surface of the main body 14A of the holder member 14 is made longer than the overall thickness T1 of a supposed interior material 110 and the body panel 106.

As can be seen from FIGS. 1 to 5, the flange portions 40 are formed so as to contact an inner surface (hole wall) of a mounting hole 112 of the interior material 110 along a substantially entire periphery of the mounting hole 112. For this reason, the flange portions 40 are fit into the mounting hole 112 from inside, thereby preventing the grommet member 16 from being unstably mounted in the interior material 110. As shown in FIG. 5, the length L2 of the flange portion 40 along the axial direction is made longer than the thickness T2 of the supposed interior material 110.

A pair of convex portions 42 are respectively formed in the flange portions 40 so as to project outward. In the state in which the sun visor holder 12 is mounted in the interior of a vehicle, the convex portions 42 are respectively engaged with concave portions 114 formed in the mounting hole 112 of the interior material 110. As a result, inadvertent rotation or unstable mounting of the sun visor holder 12 is reliably prevented still further.

Each engaging claw 26 formed in the leg portion 24 of the holder member 14 is formed so as not to overhang further outward than the convex portion 42 in the state in which the grommet member 16 is mounted at the leg portion 24. Therefore, at the time of mounting on a vehicle body, the engaging claws 26 are each provided so as not to be caught by the mounting hole 112 of the interior material 110.

A concave groove 44 is formed on the outer surface of each of the block portions 36 of the grommet member 16 along the axial direction. The holder member 14 includes rotation-stopping protrusions 46 which engage with the concave grooves 44 with the grommet member 16 being mounted at the leg portion 24. For this reason, as is also seen from FIG. 1, even if the grommet member 16 is about to inadvertently rotate with respect to the leg portion 24, when rotating force is a predetermined value or less, each concave groove 44 abuts against the respective rotation-stopping protrusions 46 and the rotation of the grommet member 16 is prevented. If the rotating force exceeds the predetermined value, the grommet member 16 runs on each rotation-stopping protrusion 46 and can rotate with respect to the holder member 14.

A cantilever arm-shaped holding piece 48 is formed so as to extend from each concave groove 44 slantingly toward the holder member 14. (Namely, each holding piece 48 extends in a direction opposite to an insertion direction of the sun visor holder 12, which will be described later, so as to be apart from the grommet member 16.) As shown in FIGS. 3 to 5, in the state in which the grommet member 16 is mounted at the leg portion 24, an end 48A of each holding piece 48 is positioned within a plane P (in FIG. 5, the upper surface of the interior material 110) formed by the engaging end surfaces 40A of the flange portions 40. When the sun visor holder 12 is inserted in the mounting hole 112 of the interior material 110, each end 48A of the holding piece 48 contacts the interior material 110 from the side of the end of the grommet member 16, and the sun visor holder 12 engages with the interior material 110 (a temporarily fastened state).

A clearance 50 is provided between the block portions 36, and the engaging claws 26 are inserted in the clearance 50 with the grommet member 16 being mounted at the leg portion 24. Further, an annular type bridge portion 52 is formed in the vicinity of the end of the grommet member 16 in such a manner as to span between the block portions 36.

A fixed clearance between the block portions 36 is maintained by the bridge portion 52. An engaging end surface 54 is formed in a top surface of the bridge portion 52 (at an inner side of the block portions 36). When the grommet member 16 is mounted at the leg portion 24, the engaging projections 30 of the leg portion 24 are engaged.

The grommet member 16 is formed in such a manner that a portion in the vicinity of the top end thereof is tapered. Therefore, the grommet member 16 can be easily inserted in the mounting hole 112 of the interior material 10 and also in the mounting hole 108 of the body panel 106, as will be described later.

The sun visor holder 12 of the present invention is provided in such a manner that the grommet member 16 having the above-described structure is made integrally with the holder member 14 in a state of being mounted at the leg portion 24. When the grommet member 16 is mounted at the leg portion 24, as shown in FIGS. 3 and 4, the grommet member 16 is pushed in with the leg portion 24 being made to abut against the insertion portion 38 in such a situation that projecting directions of the engaging claws 26 and the holding pieces 48 are the same. In the middle of this push-in operation, each guiding surface 26B of the engaging claw 26 is pushed by the inner surface of respective block portions 36 and each engaging claw 26 deflects inwardly. Accordingly, the grommet member 16 can be further pushed in. The convex portions 42 contact the rotation-stopping protrusions 46 and the bridge portion 52 is engaged at a position between the stepped portion 56 and the engaging projections 30. As a result, the grommet member 16 is not inadvertently pulled out from the leg portion 24. In this state, when the grommet member 16 is rotated around the axial line J at 90 degrees with respect to the leg portion 24, the rotation-stopping protrusions 46 come into the concave grooves 44 and each engaging claw 26 comes into the clearance 50 to elastically return to its original state. As a result, rotation of the grommet member 16 is prevented. The grommet member 16 is thus placed in a mounted state by being held by the leg portion 24 at a proper position. As described above, the sun visor holder 12 can be provided in such a manner that the grommet member 16 and the holder member 14 are made integrally with each other by a simple operation in which the grommet member 16 is merely pushed in and rotated with respect to the leg portion 24. Moreover, when the grommet member 16 is rotated so as to be mounted with respect to the leg portion 24, namely, when the rotation-stopping protrusions 46 come into the concave grooves 44, a suitable "click" feeling is obtained, thereby making it possible to confirm that the grommet member 16 has been mounted at the proper position.

Alternatively, the grommet member 16 may be pushed in with the leg portion 24 being made to abut against the insertion portion 38 in such a situation that the projecting directions of the engaging claws 26 and opening directions of the clearance 50 are the same. In this case, the grommet member 16 can be mounted only by the push-in operation without being rotated, and mounting thereof is further facilitated.

Next, a method for mounting the sun visor holder 12 of the present embodiment in a vehicle, and the operation of the sun visor holder 12 will be described.

In a case in which the sun visor holder 12 is mounted in a vehicle, first, as shown in FIG. 5, the sun visor holder 12 is inserted, from the side of the end of the grommet member 16, into the mounting hole 112 of the interior material 110. The portion of the grommet member 16 in the vicinity of the end thereof is tapered, and therefore, the grommet member 16 can be easily inserted. In the substantially middle of the inserting, the holding pieces 48 contact the edge of the mounting hole 112, but the holding pieces 48 elastically deflect inwardly. Therefore, the grommet member 16 can be further inserted.

When the interior material 110 is located between the ends 48A of the holding pieces 48 and the main body 14A of the holder member 14, each holding piece 48 is not any longer pushed by the edge of the mounting hole 112 and restores (returns) to its natural (original) state due to elastic reaction force. As a result, the interior material 110 is positioned between the holding pieces 48 and the main body 14A of the holder member 14, and the sun visor holder 12 engages with the interior material 110 and is placed in a temporarily fastened state. Generally, the sun visor holder 12 is inserted from the lower side into the mounting hole 112 of the interior material 110. Accordingly, even if insertion of the sun visor holder 12 is stopped by an operator in the temporarily fastened state (for example, even if an operator separates a his (or her) hand or a tool from the sun visor holder 12), the holding pieces 48 are caught by the interior material 110 due to gravity acting on the sun visor holder 12. As a result, the sun visor holder 12 is maintained in the temporarily fastened state.

In the above-described state, the flange portions 40 engage with the mounting hole 112 from the inner side, and the convex portions 42 are engaged with the concave portions 114 of the mounting hole 112. Therefore, inadvertent rotation or unstable mounting of the sun visor holder 12 with respect to the interior material 110 is reliably prevented. Moreover, the ends 48A of the holding pieces 48 are positioned on the plane formed by the engaging end surfaces 40A of the flange portions 40. Therefore, even if gravity acts on the sun visor holder 12, downward movement of the sun visor holder 12 is restricted. Accordingly, even when, for example, the thickness T2 of the interior material 110 is small, the state in which the flange portions 40 engage with the mounting hole 112 and the convex portions 42 are engaged with the concave portions 114 of the mounting hole 112, is reliably maintained.

In the sun visor holder 12, the length L2 of each flange portion 40 along the axial direction is made longer than the thickness T2 of the supposed interior material 110. Accordingly, the sun visor holder 12 can be mounted to any type of supposed interior materials.

Next, the sun visor holder 12 is inserted in the mounting hole 108 of the body panel 106 from the side of the distal end of the grommet member 16. In the same manner as in the case in which the sun visor holder 12 is inserted in the mounting hole 112 of the interior material 110, the grommet member 16 can be easily inserted by reason that the portion of the grommet member 16 in the vicinity of the distal end thereof is tapered. In the substantially middle of the inserting, the engaging claws 26 contact the edge of the mounting hole 108, but the engaging claws 26 each elastically deflect inwardly in such a manner that the guiding surfaces 26B are pushed by the mounting hole 108. Accordingly, the grommet member 16 can be further inserted.

When the body panel 106 is positioned between the engaging surfaces 26A of the engaging claws 26 and the engaging end surfaces 40A of the flange portions 40, the engaging claws 26 each elastically restore, and therefore, the body panel 106 is engaged with and nipped by the engaging surfaces 26A and the engaging end surfaces 40A. As a result, the sun visor holder 12 is mounted in a vehicle in such a state that the mounting hole 112 of the interior material 110 and the mounting hole 108 of the body panel 106 are aligned with each other. In the present invention, it is not necessary that the sun visor holder be mounted after the mounting holes 112 and 108 have been aligned with each other like a conventional sun visor holder. Therefore, the efficiency with which the sun visor holder is mounted on the body panel is greatly improved. In addition, the sun visor holder 12 can be mounted on a vehicle body only by inserting the grommet member 16 sequentially into the mounting holes 112 and 108, and a screw-fastening operation in the conventional sun visor holder is not required. Accordingly, mounting efficiency further improves and an operator's working burden is reduced.

Further, the axial-direction length L1 between the position at which the body panel 106 is held, and the main body 14A of the holder member 14 is made longer than the overall thickness T1 of the supposed interior material 110 and body panel 106. Accordingly, the sun visor holder 12 can be mounted to any type of the supposed interior material 110 and body panel 106. When the thickness of the body panel 106 is small, as is also shown in FIG. 6, a required thickness of the body panel 106 is obtained (namely, a height of a peripheral region of the mounting hole 108 is higher than that of the remain portion of the body panel 106) by partially deforming the peripheral region of the mounting hole 108 in a direction of thickness of the panel (for example, pressing, drawing), and a substantial (apparent) thickness of the interior material 110 and the body panel 106 (that is, the thickness of a region in the vicinities of the mounting holes 112 and 108 in which the sun visor holder 12 is engaged) is adjusted. As a result, the sun visor holder 12 can be mounted.

In the state in which the sun visor holder 12 is mounted in a vehicle body, the shaft of the sun visor 102 can be held by the holding portion 18 in a removable (attachable and detatchable) manner. In this case, when, for example, force of a predetermined value or more acts on the holding portion 18 via the shaft 104 of the sun visor 102, the fragile portion 32 of the leg portion 24 is broken. As a result, the leg portion 24 and the grommet member 16 remain at the side of the vehicle body, and therefore, no pieces of a broken component of the sun visor holder 12, or the like fly apart. Further, there is no possibility that the broken section may project toward the interior of a vehicle.

When the sun visor holder 12 is removed from the vehicle body, the holder member 14 is rotated in a direction in which the release inclined surfaces 26C contact the block portions 36. At this time, rotation of the grommet member 16 is temporarily stopped by the rotation-stopping protrusions 46. When the rotating force exceeds a predetermined value, the grommet member 16 runs on to the rotation-stopping protrusions 46 and the grommet member 16 is made rotatable with respect to the holder member 14. Due to the rotation of the grommet member 16, the engaging claws 26 deflect inwardly and are entered into the block members 36, and the state in which the sun visor holder 12 is engaged with the body panel 106 is released. At this time, the engaging projections 30 are maintained in the state of being engaged and fastened to the engaging end surface 54. Therefore, the grommet member 16 is not inadvertently pulled out from the leg portion 24. The sun visor holder 12 is pulled down from the above-described state and can be pulled out from the mounting hole 108 of the body panel 106. In this case, the ends 48A of the holding pieces 48 contact to engage with the interior material 110. This engaged state is released by deflecting the holding pieces 48 inwardly, and the sun visor holder 12 can be pulled out from the mounting hole 112 of the interior material 110. As described above, removal of the sun visor holder 12 according to the present embodiment from a vehicle body can also be carried out easily.

In the foregoing, there has been described, as an example of the sun visor holder 12, a structure formed by two members, that is, the holder member 14 and the grommet member 16. However, the present invention is not limited to a structure formed by two members. The sun visor holder may be formed by one integrated member. As described above, the structure formed by two members increases the degree of freedom in the shape of each member. Therefore, if the mounting holes 112 and 108 are each formed in a complex shape, each member can be easily formed to correspond thereto. Further, the sun visor holder 12 is generally made from resin. In the structure formed by two members, restrictions imposed at the time the members are formed can be reduced. Accordingly, the sun visor holder 12 can be manufactured at a low cost.

Since the present invention provides the above-described structure, the efficiency with which the sun visor holder is mounted on the body panel is greatly improved.

What is claimed is:

1. A sun visor holder comprising:
   a holding portion which can hold a shaft of a sun visor;
   an interior material engaging portion which interlocks with an interior material of a vehicle; and
   a body panel engaging portion which engages with a body panel of the vehicle in a state in which said interior material engaging portion which interlocks with the interior material.

2. A sun visor holder according to claim 1, further comprising:
   an insertion portion inserted both in a mounting hole formed in the interior material and in a mounting hole formed in the body panel,
   wherein said interior material engaging portion can be engaged with the interior material by an operation of inserting said insertion portion in the mounting hole of the interior material, and
   said body panel engaging portion can be engaged with the body panel by an operation of inserting said insertion portion in the mounting hole of the body panel.

3. A sun visor holder according to claim 2, wherein said insertion portion includes a fitting portion which is fit into the mounting hole of the interior material in a state in which said interior material engaging portion is engaged with the interior material; and
   said interior material engaging portion is formed so as to contact the interior material from a side of an end of said insertion portion, with said fitting portion being fit into the mounting hole of the interior material.

4. A sun visor holder according to claim 1, further comprising:
   a grommet member including said interior material engaging portion and a nipping portion for nipping the body panel together with said body panel engaging portion; and
   a holder member including said holding portion and said body panel engaging portion and engaged with said grommet member by being rotated, said holder member including a rotation stopping portion for stopping rotation of said holder member in a state of being engaged with said grommet member.

5. A sun visor holder according to claim 2, further comprising:

a grommet member including said interior material engaging portion and a nipping portion for nipping the body panel together with said body panel engaging portion; and a holder member including said holding portion and said body panel engaging portion and engaged with said grommet member by being rotated, said holder member including a rotation stopping portion for stopping rotation of said holder member in a state of being engaged with said grommet member.

6. A sun visor holder according to claim 3, further comprising:

a grommet member including said interior material engaging portion and a nipping portion for nipping the body panel together with said body panel engaging portion; and a holder member including said holding portion and said body panel engaging portion and engaged with said grommet member by being rotated, said holder member including a rotation stopping portion for stopping rotation of said holder member in a state of being engaged with said grommet member.

7. A sun visor holder according to claim 4, wherein said holder member includes a fragile portion which is broken when a load of a predetermined value or more acts on said holding portion.

8. A sun visor holder according to claim 4, wherein said rotation stopping portion is a protruding member, and said rotation stopping portion is engaged with a groove portion formed in said grommet member to prevent relative rotation of said holder member with respect to said grommet member in a state in which said holder member is engaged with said grommet member.

9. A sun visor holder according to claim 2, wherein one end of said interior material engaging portion is provided at said insertion portion and another end of said interior material engaging portion extends in a direction opposite to an insertion direction of said insertion portion so as to be apart from said insertion portion, and said interior material engaging portion can deform elastically to be close to said insertion portion.

10. A sun visor holder according to claim 2, wherein said body panel engaging portion protrudes outside of said insertion portion, and can deform elastically inside of said insertion portion.

11. A sun visor holder according to claim 2, wherein a first guide surface is formed in said body panel engaging portion, said first guide surface guiding said body panel engaging portion so as to elastically deform inside of said insertion portion when said insertion portion is inserted into the mounting hole of the body panel.

12. A sun visor holder according to claim 4, wherein a second guide surface is formed in said body panel engaging portion, said second guide surface guiding said body panel engaging portion so as to elastically deform inside of said grommet member when said holder member is relatively rotated with respect to said grommet member in a state in which said holder member is engaged with said grommet member.

13. A sun visor holder according to claim 2, wherein an end portion of said insertion portion has a tapered shape.

14. A sun visor holder comprising:

a holding portion which can hold a shaft of a sun visor;

an interior material engaging portion which engages with an interior material of a vehicle;

a body panel engaging portion which engages with a body panel of the vehicle in a state in which said interior material engaging portion engages with the interior material; and an insertion portion inserted both in a mounting hole formed in the interior material and in a mounting hole formed in the body panel; wherein said interior material engaging portion can be engaged with the interior material such that when said insertion portion is inserted into the mounting hole of the interior material, said interior material engaging portion deforms according to an insertion of said insertion portion to the mounting hole of the interior material, and after the insertion of said insertion portion into the mounting hole of the interior material, said interior material engaging portion returns to a substantially original shape thereof, and said body panel engaging portion can be engaged with the body panel such that when said body panel engaging portion is inserted into the mounting hole of the body panel, said body panel engaging portion deforms according to an insertion of said insertion portion into the mounting hole of the body panel, and after the insertion of said insertion portion into the mounting hole of the body panel, said body panel engaging portion returns to a substantially original shape thereof.

15. A sun visor holder according to claim 14, wherein said insertion portion includes a fitting portion which is fit into the mounting hole of the interior material in a state in which said interior material engaging portion is engaged with the interior material; and said interior material engaging portion is formed so as to contact the interior material from a side of an end of said insertion portion, with said fitting portion being fit into the mounting hole of the interior material.

16. A sun visor holder according to claim 14, further comprising:

a grommet member including said interior material engaging portion and a nipping portion for nipping the body panel together with said body panel engaging portion; and a holder member including said holding portion and said body panel engaging portion and engaged with said grommet member by being rotated, said holder member including a rotation stopping portion for stopping rotation of said holder member in a state of being engaged with said grommet member.

17. A sun visor holder according to claim 16, wherein said holder member includes a fragile portion which is broken when a load of a predetermined value or more acts on said holding portion.

18. A sun visor holder according to claim 16, wherein said rotation stopping portion is a protruding member, and said rotation stopping portion is engaged with a groove portion formed in said grommet member to prevent relative rotation of said holder member with respect to said grommet member in a state in which said holder member is engaged with said grommet member.

19. A sun visor holder according to claim 14, wherein one end of said interior material engaging portion is provided at said insertion portion and another end of said interior material engaging portion extends in a direction opposite to an insertion direction of said insertion portion so as to be apart from said insertion portion, and said interior material engaging portion can deform elastically to be close to said insertion portion.

20. A sun visor holder according to claim 14, wherein said body panel engaging portion protrudes outside of said insertion portion, and can deform elastically inside of said insertion portion.

21. A sun visor holder according to claim 14, wherein a first guide surface is formed in said body panel engaging portion, said first guide surface guiding said body panel engaging portion so as to elastically deform inside of said insertion portion when said insertion portion is inserted into the mounting hole of the body panel.

22. A sun visor holder according to claim 16, wherein a second guide surface is formed in said body panel engaging portion, said second guide surface guiding said body panel engaging portion so as to elastically deform inside of said grommet member when said holder member is relatively rotated with respect to said grommet member in a state in which said holder member is engaged with said grommet member.

23. A sun visor holder according to claim 16, wherein an end portion of said grommet member has a tapered shape.

* * * * *